US009231812B2

(12) United States Patent
Manssour (10) Patent No.: US 9,231,812 B2
(45) Date of Patent: Jan. 5, 2016

(54) METHOD AND ARRANGEMENT FOR RESOURCE ALLOCATION FOR CODED MULTIDIRECTIONAL RELAYING

(75) Inventor: Jawad Manssour, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 287 days.

(21) Appl. No.: 13/820,398

(22) PCT Filed: Sep. 3, 2010

(86) PCT No.: PCT/SE2010/050942
§ 371 (c)(1),
(2), (4) Date: Mar. 1, 2013

(87) PCT Pub. No.: WO2012/030263
PCT Pub. Date: Mar. 8, 2012

(65) Prior Publication Data
US 2013/0163552 A1    Jun. 27, 2013

(51) Int. Cl.
*H04L 27/34* (2006.01)
*H04W 72/04* (2009.01)
*H04B 7/155* (2006.01)
(Continued)

(52) U.S. Cl.
CPC ............ *H04L 27/34* (2013.01); *H04B 7/15521* (2013.01); *H04L 1/0041* (2013.01); *H04L 1/0045* (2013.01); *H04L 1/0076* (2013.01); *H04W 56/009* (2013.01);
(Continued)

(58) Field of Classification Search
CPC ....................................................... H04L 27/34
See application file for complete search history.

(56) References Cited

U.S. PATENT DOCUMENTS

| 8,208,434 B2 * | 6/2012 | Sayana et al. ................. 370/329 |
| 2008/0219251 A1 * | 9/2008 | Xue et al. ...................... 370/389 |

(Continued)

FOREIGN PATENT DOCUMENTS

| WO | 2006/071187 A2 | 7/2006 |
| WO | 2009/041884 A2 | 4/2009 |
| WO | 2010019083 A1 | 2/2010 |

OTHER PUBLICATIONS

Oh. J., et al., "Rate Control for Sum-Rate Maximization in Wireless Network Coding", Vehicular Technology Conference Fall (VTC 2009 Fall), 2009 IEEE 70th, IEEE, Piscataway, NJ, USA, Sep. 20, 2009, pp. 1-5, XP031600265.

(Continued)

*Primary Examiner* — Brian D Nguyen
*Assistant Examiner* — Toan Nguyen
(74) *Attorney, Agent, or Firm* — Rothwell, Figg, Ernst & Manbeck, P.C.

(57) ABSTRACT

The present invention relates to a method and a network coding node for resource allocation applicable to multi-directional network coding in an exchanging system. By estimating the number of bits per resource element (steps 402, 404) on uplink channels to a network coding node (200, 304, 504, 604), the number of resource elements for the sending on said uplinks is determined (step 410) to fully utilize the resources, i.e. such that link underutilization is avoided as well as incorporation of delays are avoided. The number of resource elements is decided such that the data transmitted to the network coding node is provided to end-nodes (302, 306, 502, 506, 602, 606) by sending one and the same representation of the data from a first and a second end-node, to said first and second end-nodes enabling extracting data originated from the differing end-node.

19 Claims, 5 Drawing Sheets

(51) Int. Cl.
*H04W 56/00* (2009.01)
*H04L 1/00* (2006.01)

(52) U.S. Cl.
CPC ............ *H04W 72/04* (2013.01); *H04L 1/0001* (2013.01); *H04L 2001/0097* (2013.01)

(56) References Cited

U.S. PATENT DOCUMENTS

| | | | |
|---|---|---|---|
| 2011/0038344 A1* | 2/2011 | Chmiel et al. | 370/330 |
| 2011/0110284 A1* | 5/2011 | Wu et al. | 370/312 |
| 2011/0110314 A1 | 5/2011 | Manssour | |
| 2011/0141980 A1* | 6/2011 | Wang et al. | 370/329 |

OTHER PUBLICATIONS

Ahlswede et al., "Network Information Flow," IEEE Transactions on Information Theory, vol. 46, No. 4, Jul. 2000, 13 pages.

* cited by examiner

METHOD AND ARRANGEMENT FOR RESOURCE ALLOCATION FOR CODED MULTIDIRECTIONAL RELAYING

CROSS-REFERENCE TO RELATED APPLICATION

This application is a 35 U.S.C. §371 National Phase Entry Application from PCT/SE2010/050942, filed Sep. 3, 2010, and designating the United States.

TECHNICAL FIELD

This invention pertains in general to the field of coded multidirectional relaying. More particularly the invention relates to resource allocation for coded multidirectional relaying.

BACKGROUND

Network Coding, NC, is an area of networking which recently has gained interest. Network Coding concerns manipulation of data at one or more nodes intermediate to a sending node and a receiving node within a network, to improve, for example, throughput, delay, and robustness. In particular, NC allows the nodes to recombine several input packets of data into one or several output packets. At the intermediate nodes, coding is performed on the available packets, and the resulting encoded packets are broadcasted to separate receiving nodes simultaneously rather than transmitting to each node separately.

A major application area of network coding is bidirectional relaying. Bidirectional relaying refers to the case where two end-users, here denoted U1 and U2 have data, here denoted s1 and s2, respectively, want to exchange their information via a third node R, which plays the role of a relaying node.

In general, network coding applied to bidirectional relaying in systems is referred to as coded bidirectional relaying in systems.

In order to exchange data between two end-users U1 and U2 connected to a third node, a total of 4 transmissions is needed when applying conventional bidirectional relaying to complete the data exchange.

The first transmission transfers data s1 from end-node U1 to R. The second transmission forwards data s1 from R to end-node U2. The third transmission transfers data s2 from end-node U2 to node R, and the fourth transmission forwards data s2 from node R to end-node U1.

If applying coded bidirectional relaying in network coding of data between two end-nodes connected by a third node R, it is sufficient with a total of 3 transmissions in order to complete the data exchange.

Bidirectional relaying may be performed on data bits by using bit-level network coding, or on complex data by using multi-domain network coding on the symbol level. Depending on whether bit-level or multi-domain network coding is performed, different processing at, at least one of the nodes will have to be carried out, as described hereinafter.

By applying bit-level network coding end-node U1 transmits data s1 to node R and end-node U2 can transmit data s2 to node R. At node R data s3 is formed according to s3=s1 XOR s2, where XOR is a bitwise XOR operation. Node R then transmits data s3 to end-node U1 and U2. End-node U1 already knowing data s1, now performs network decoding of data s3 and calculates s1 XOR s3=s1 XOR (s1 XOR s2)=(s1 XOR s1) XOR s2=0 XOR s2=s2. End-node U2 similarly calculates s2 XOR (s2 XOR s1)=(s2 XOR s2) XOR s1=s1. End-nodes U1 and U2 have thus obtained exchanged data from a total of three transmissions. The network decoding step here undoes the network coding.

Of course, XOR is not the only network coding operation possible, but other types of coding operations may be used instead. The most important is that these coding operations have the property that if we have data s1 and a combination of data s1 and data s2, we obtain data s2, or if we have data s2 and a combination of data s1 and data s2, we obtain data s1.

Whereas bit-level network coding operates on bits, multi-domain network coding operates on symbols that are complex in nature. Transmission using multi-domain network coding resembles transmission on the bit-level. In fact the first steps are the same. Firstly, data s1 is transmitted from end-node U1 to node R. Secondly, data s2 is transmitted from end-node U2 to node R. At node R multi-domain network coded data s3 is created based on received data s1 and data s2. The created network coded data s3 is then transmitted to both end-nodes U1 and U2. At end-nodes U1 and U2 the coded data s3 can be network decoded by using a priori known data s1 or data s2, revealing data s2 or data s1, respectively.

Compared to bit-level network coding, multi-domain network coding is performed on the symbol of modulated information. Multi-domain network coding has an advantage compared to bit-level network coding in that symbols that are coded together may have different modulations, where each modulation is suited to the link on which they will be transmitted.

In summary, using coded bidirectional relaying requires a total of three transmissions to perform the data exchange as opposed to the four transmissions as required by conventional bidirectional relaying. One transmission out of four transmissions is therefore saved. This results in a capacity gain of up to 4/3, apart from the fact that only one transmission has to be performed by the node R to transmit data that represents data s1 and data s2.

In the case node R is a base station, and the end-nodes are User Equipments, the base station is only required to transmit once instead of two times, and therefore saves half the power needed to transmit data, as compared to conventional data transmission.

There are however drawbacks with prior art bidirectional network coding as will be pointed out down below.

Figure 1:
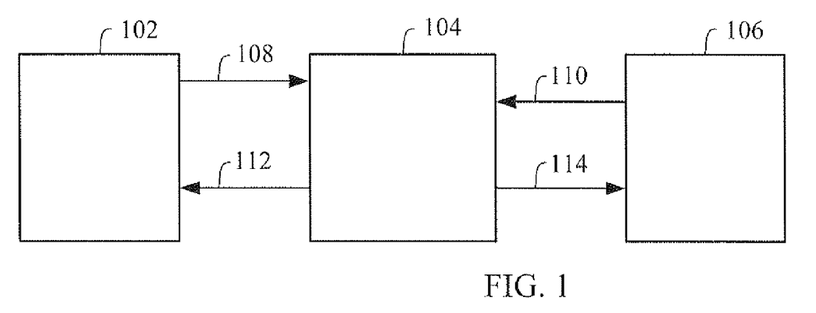

Consider the communication system of two end-users U1 and U2 connected to each other via the node R. FIG. 1 schematically illustrates such a system.

Denote the Up-Link between end-user U1 102 and node R 104, the U1 Up-Link or U1 UL 108. Also, denote the Up-Link between end-user U2 106 and node R 104, the U2 Up-Link or U2 UL 110. Similarly, denote the Down-Link between node R 104 and end-user U1 102, U1 Down-Link or U1 DL 112. In addition, denote the Down-Link between node R 104 and end-user U2 106, U2 Down-Link or U2 DL 114.

The data of U1 102 will thus have to be transmitted using the U1 UL channel 108 and the U2 DL channel 114. Similarly, the data of U2 106 will have to be transmitted using the U2 UL 110 channel and the U1 DL 112 channel.

The two Up-Link channels and the two Down-Link channels are typically different, and will consequently allow carrying different amounts of information.

This asymmetry of links may however cause underutilization of the capacity of the links, delay in the reception of data as transmitted on the channels, and create complexity to transmitting data that could not be network encoded caused by underutilization of the link capacity.

The following examples will describe the above limitations and hence the disadvantages with the prior art technique.

PRIOR ART DISADVANTAGE EXAMPLE 1

Firstly, assume that the Up-Link between end-node U1 and node R, i.e. U1 UL is able to support Quadrature Phase Shift Keying (QPSK) modulation. Secondly, assume that the Up-Link between end-node U2 and node R, i.e. U2 UL is able to support 16 Quadrature Amplitude Modulation (QAM).

Using QPSK modulation means that each transmitted symbol on this UL from end-user U1 to node R contains 2 bits per symbol, whereas using 16 QAM each transmitted symbol from end-user U2 to node R contains 4 bits per symbol. Furthermore, assume that the Down-Link between end-user U1 and node R supports 64 QAM, and that the DL between end-user U2 and node R supports 64 QAM. This means that each transmitted symbol from node R to end-user U1 contains 6 bits, and each transmitted symbol from node R to end-user U2 contains 6 bits.

Assume that U1 transmits data s1=01 and that U2 transmits data s2=0001. For bit-level network coding as used herein, the bit length for data s1 and for data s2 have to be equal. Since data s1 and data s2 are of different sizes, node R has two alternatives to form data of equal length. One alternative is to use part of the bits in data s2, i.e. part of four bits, so that formed data has the same length as data s1. Another alternative is to perform zero padding to data s1, i.e. add zeros to the data s1 to form new data having the same length as data s2. Both methods have reduced flexibility and would increase the complexity of the system for relaying data, as will be pointed out down below.

In addition, the transmission from node R supports 6 bits per symbol, since both the U1 DL and U2 DL supports 64 QAM. Node R may however not have that many bits to transmit. Node R will have 2 bits to transmit, in the case only a part of data s2 is used. Node R will have 4 bits to transmit, in the case of zero padding to data s1 to form four bits. Node R will thus transmit 2 or 4 out of 6 bits, which corresponds to 33% and 66%, respectively.

The system will thus have a considerable throughput loss ranging from 33%, for zero-padding, to 66% for partially using data s1.

PRIOR ART DISADVANTAGE EXAMPLE 2

The system again comprises the end-users U1 and U2 connected via the node R. Assume that the U1 UL channel is able to support 64 QAM, whereas the U2 UL channel is only able to support 16 QAM. Further, assume that U1 DL channel and U2 DL channel can both support QPSK.

For multi-domain network coding the U1 UL channel thus supports 6 bits per symbol, and the U2 UL supports 4 bits per symbol. Since only 2 bits are transmitted from node R, only 2 bits out of a total of 6 bits that U1 transmitted are network-coded with the 2 out of the 4 bits that U2 transmitted. As a consequence, a considerable amount of data are thus not timely transmitted, as 4 bits out of the 6 transmitted by U1 will not be transmitted, and 2 bits out of the 4 transmitted by U2 will not be transmitted. Transmitting a part of the received amount of data only obviously creates delay in the system.

As network coding reduces the number of required transmissions in a bidirectional exchanging system, a gain in capacity should be expected. However, due to the demonstrated underutilization of the links, delay in data reception and added complexity in handling the network coding operation at the relaying node and in the network decoding operation at the end-users, a straight forward application of network coding is unable or insufficient to achieve the capacity gain that corresponds to the decrease in the number of transmissions.

There is thus a need to overcome the prior art disadvantages.

SUMMARY

The present invention seeks to mitigate, alleviate or eliminate one or more of the above-identified deficiencies in the prior art and disadvantages singly or in any combination and solves at least the above mentioned problems by providing a network coding node and methods therein according to the appended patent claims.

According to one aspect of the present invention a method in a network coding node, said network coding node being configured to receive a first stream of bits from a first node, to receive a second stream of bits from a second node and to provide said first and second stream of bits to said second and first node, respectively, using network coding, is provided. The method comprises estimating a first number of bits to be received per resource element from said first node, as well as estimating a second number of bits to be received per resource element from said second node. The method also comprises determining a first and a second number or resource elements for the first and second node, respectively. Within the method, allocating a first number of resource elements for the first node, is also performed, for providing said first stream of bits to the network coding node. A second number of resource elements is also allocated in the method for the second node for providing said second stream of bits to the network coding node.

The first number of resource elements and the second number of resource elements are determined by fitting the bits received from each one of said first node and said second node in an equal integer number of resource elements to be allocated for providing said first and second stream of bits using network coding.

The determination of the first number or resource elements within the method may be based on the estimated first number of bits to be received per resource element from said first node.

Also, the second number of resource elements may be determined, within the method, based on the estimated second number of bits to be received per resource element from said second node.

The first number of resource elements and said second number of resource elements may be determined based on estimates of the number of bits to be sent per resource element to the second and first node, respectively.

Provision of the first and second stream of bits to said second and first node, respectively, may be performed by sending one and the same representation of said first and said second stream of bits to said first and second node.

Sending one and the same representation of said first and said second stream of bits may comprise said first stream of bits network coded with said second stream of bits.

The step of estimating a first number of bits per resource element within the method may comprise estimating the modulation order for a link from the first node to the network coding node.

A second number of bits per resource element may be estimated within the method by estimating the modulation order for a link from said second node to the network coding node.

According to one aspect of the present invention, there is provided a network coding node for multidirectional communication with at least a first and a second node, the network coding node. The network coding node comprises a communication interface configured to receive a first stream of bits from the first node, and a second stream of bits from the second node, and to provide said first and second stream of bits to said second and first node. The network coding node further comprises a processing unit that is configured to estimate a first number of bits to be received per resource element from said first node, and a second number of bits to be received per resource element from said second node. In addition, the processing unit is configured to determine a first and second number of resource elements for the first and second node, respectively. The network coding node also comprises a scheduling unit that is configured to allocate a first number of resource elements for providing said first stream of bits to the network coding node, and to allocate a second number of resource elements for providing said second stream of bits to the network coding node.

The processing unit of the network coding node is further configured to determine the first and second number of resource elements by fitting bits of the first number of resource elements each having the first number of bits for the first node, and bits of the second number of resource elements each having the second number of bits for the second node, in an equal number of resource elements to be allocated for providing said first and second stream of bits to the second node and the first node, respectively, by using network coding.

The processing unit of the network coding node may further be configured to determine the first number of resource elements based on the estimated first number of bits to be received per resource element from the first node, and to determine the second number of resource elements based on the estimated second number of bits to be received per resource element from the second node.

The processing unit of the network coding node may further be configured to estimate a third number of bits to be sent per resource element to the second node, to estimate a fourth number of bits to be sent per resource element to the first node.

The processing unit may also be configured to determine the first and second number of resource elements based the estimated number of bits to be sent per resource element to the second and the first node, respectively.

The processing unit of the network coding node may further be configured to estimate the first number of bits per resource element, by estimating the modulation order for a link from the first node to the network coding node, and to the second number of bits per resource element by estimating the modulation order for a link from the second node the network coding node, respectively.

The network coding node may comprise any one of a User Equipment, UE, a base station and a relay node. The base station may comprise a NodeB or an evolved NodeB, eNodeB Embodiments of the present invention come with the following advantages:

By providing a generic method for resource allocation applicable to a coded bidirectional exchanging systems, link underutilization is avoided, which maximizes the capacity of the utilized links. Delays that may be introduced by network coding operation are avoided and eliminated.

Applying the present invention to network coding system, a smooth network coding operation and thus a functional network coding system is assured.

As the proposed methods are easy to implement and use, complexities possibly introduced by the network coding operation are eliminated.

BRIEF DESCRIPTION OF DRAWINGS

These and other aspects, features and advantages of which the invention is capable of, will be apparent and elucidated from the following description of embodiments of the present invention, reference being made to the accompanying drawings, in which FIG. 1 schematically illustrates a bidirectional system according to the prior art.

ABBREVIATIONS

CQM Channel Quality Measure
eNB Evolved NodeB
NC Network Coding
MCS Modulation and Coding Scheme
OFDMA Orthogonal Frequency Division Multiple Access
QAM Quadrature Amplitude Modulation
QPSK Quadrature Phase Shift Keying
LTE Long Term Evolution
UE User Equipment

DETAILED DESCRIPTION

The basic concept of the invention relates to resource allocation in the time and/or frequency dimension(s) in systems employing network coding. The resource allocation utilizes varying channel qualities on separate links in addition to properties of the network coding operation in order to allocate resources in such a way that link underutilization is avoided, delays possibly introduced by the network coding operation are eliminated, and that complexities possibly introduced by the network coding operation are eliminated.

The proposed invention addresses an issue that is overlooked in prior art, namely resource allocation in order to support a network coding operation, for which there is no mismatch in the number of bits to be network coded. It is noted that for a practical setup, links are often asymmetric.

The present invention relates to resource allocation employing network coding such as bit-level network coding and multi-domain network coding.

Figure 2:
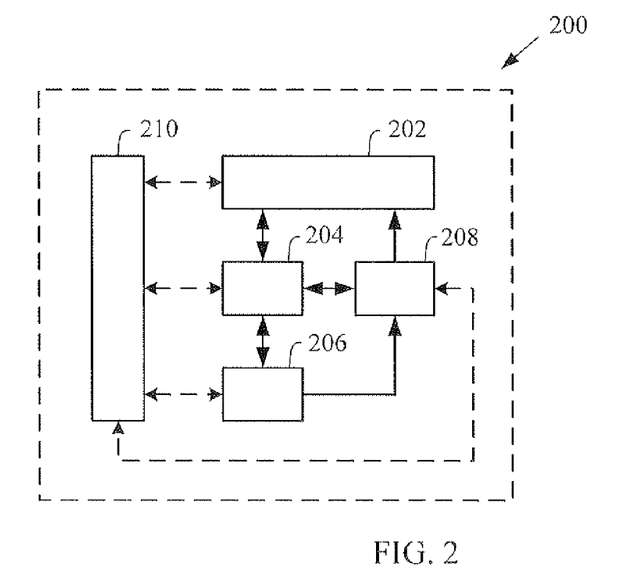
FIG. 2 schematically illustrates network coding node, according to some embodiments of the present invention.

FIG. 2 schematically presents a network coding node 200 according to the some embodiments of the present invention. The network coding node 200 comprises a communication interface 202, a processing unit 204, a scheduling unit 206 and an encoding unit 208. Also, the network coding node may comprise a control unit 210. The function of the various units will here only briefly be sketched, as they will further be described down below in more detail.

Figure 3:
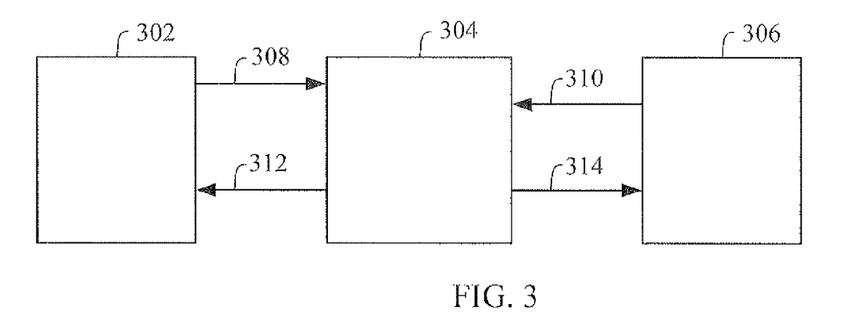
FIG. 3 schematically illustrates a network coding system according to some embodiments of the present invention.

FIG. 3 schematically presents a multidirectional network coding system according to some embodiments of the present invention. The network coding system comprises a first decoding node 302, a network encoding node 304 and a second decoding node 306. The first decoding node 302 sends data to the network encoding node 304 using a first uplink channel 308, whereas the second decoding node 306 sends data to the network encoding node 304 using a second uplink channel 310. The network encoding node 304 sends network encoded data to the first decoding node 302 using a first downlink channel 312. Similarly the network encoding node 304 sends network encoded data to the second decoding node 306 using a second Downlink channel 314.

Figure 4:
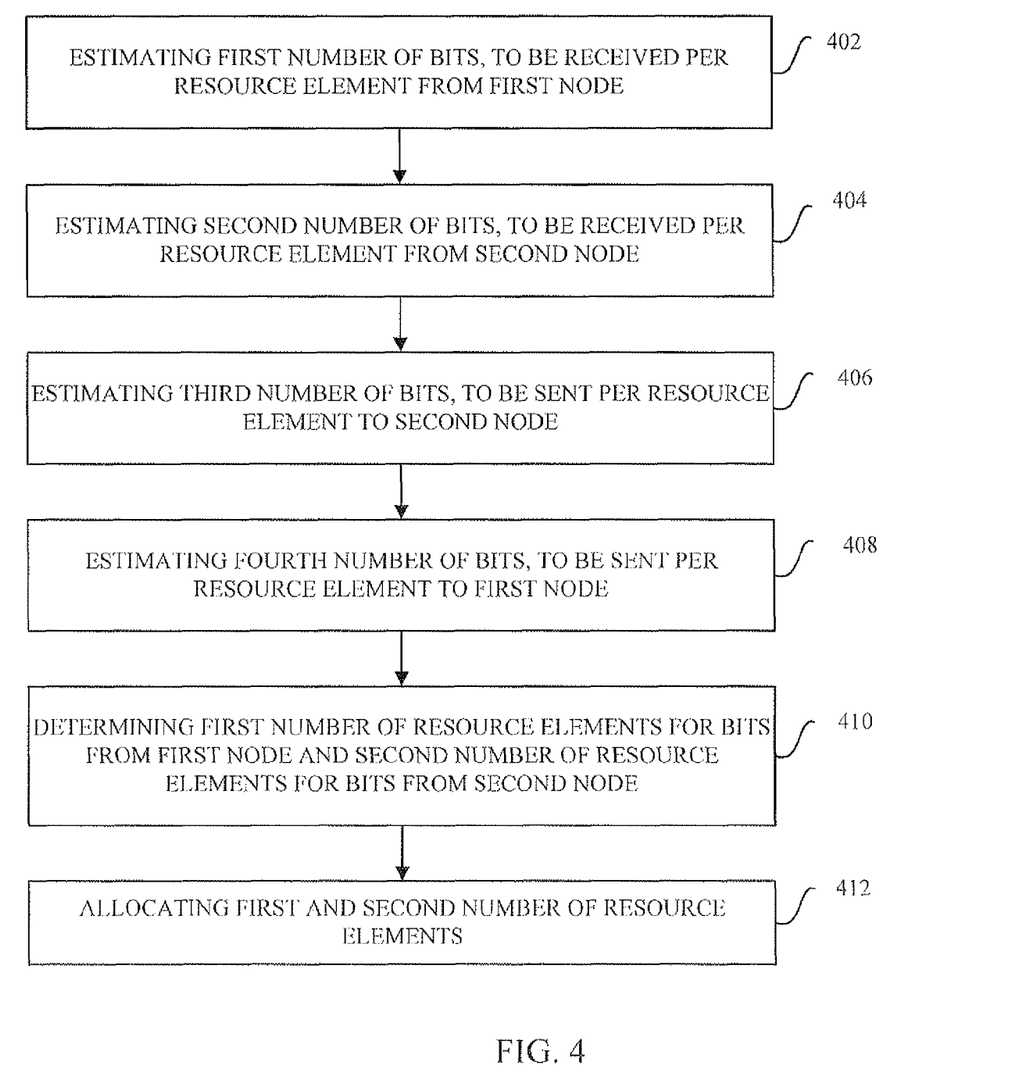
FIG. 4 illustrates a flow-chart of a method steps, according to some embodiments of the present invention, FIG. 5 schematically illustrates a network system for multi-domain network coding, related to embodiments of the present invention.

With reference to FIG. 4 schematically presenting a flowchart of method steps, a method in a network encoding node for resource allocation will be presented.

The task is thus to determine a number of resources by the network encoding node and allocate said number of resources to the decoding nodes to avoid underutilization of resources and at the same time avoid introducing delays.

Allocating too many resources for sending data leads on the one hand to underutilization of a channel to be used will occur. Allocating a too small an amount of resources leads on the other hand to that data cannot be sent during a scheduled interval and a delay is introduced.

In short, in order to allocate a proper amount of resources to network decoding nodes for transmission of data to avoid underutilization of resources and at the same time avoid introducing delays, available information about the number of bits per resource element that is to be communicated between the network decoding nodes and the network encoding node is used. Typically the amount of bits per resource element for data to be received by the network encoding node is estimated, based on the number of bits per resource element of data that has earlier been received by the network encoding node.

Accordingly, the first step in FIG. 4, is estimating a first number of bits to be received per resource element from the first network decoding node, in step 402. The following step comprises estimating the second number of bits to be received from the second network decoding node, in step 404.

The network encoding node has thus estimated the number of bits to be received per resource element, such as the number of bits per symbol.

In the following the expression "first node" may be used for the "first decoding node". Likewise, "second node" may be used for "second decoding node".

In order to determine the amount of resources needed for the first 302 and second 306 network decoding nodes, the network encoding node 304 requires information on the downlink from the network encoding node 304 to the first 302 and second 306 network decoding nodes.

In step 406, the network encoding node 304 estimates a third number of bits to be sent per resource element to the second node 306. Similarly, the network encoding node 304 estimates a fourth number of bits to be sent per resource element to the first node 302, in step 408.

Now having access to estimates of the number of bits per resource elements for both the uplink to the network encoding node and downlink from the network encoding node, said network encoding node determines the amount of resources needed for the first 302 and second 306 decoding nodes. The amount of resources may be the number of resource elements to be allocated to the first network decoding node and the number of resources to be allocated to the second network decoding node, in order to avoid underutilization of resources and delays introduced in the network system.

In step 410, the network encoding node 304 determines said number of resource elements for the first and second network decoding nodes. The principle behind the determination of resource elements is that the bits as received from the first and second network decoding nodes using said resource elements, must be fit in an equal number of resource elements on the two downlinks, i.e. from the network encoding node to the first network decoding node and the second network decoding node. The number of resource elements must be equal since the same network coded data is sent to both the first 302 and the second 306 decoding nodes.

Denote by A and B, the estimated number of bits per resource element on the uplink from the first 302 and second 306 network decoding node to the network encoding node 304, respectively. Further, denote by L and R, the estimated number of bits per resource element on the downlink from the network encoding node to the second 306 and the first 302 network decoding node, respectively.

Moreover, denote by X the first number of resource elements for the first decoding node 302 for sending data to the network encoding node 304, and denote by Y the second number of resource elements for the second decoding node 306 for sending data to the network encoding node 304. Also, denote by Z the number of resource elements for the network encoding node 304 for sending data to the first 302 and second 306 decoding node.

The bits received by the network encoding node by using the resource elements to be allocated must thus fit in an equal integer number Z of resource elements on the downlink. Accordingly, $$X*A = Z*L \quad (1)$$

$$Y*B = Z*R \quad (2)$$

From equations 1 and 2, equation 3 is obtained since Z in equation 1 and 2 are the same.

$$Y\frac{B}{R} = X\frac{A}{L} \quad (3)$$

The network encoding node 304 thus determines the number of resource elements from equation 3, by considering that Z is an integer number of resource elements.

The network encoding node 304 encodes the data received from the first decoding node 302 with the data as received from the second decoding node 306 by using network coding. Either, bit-level network coding or multidimensional network coding is used.

By using bit-level network coding, the same number of bits per resource element is used in the downlink. For this reason the minimum number of bits per resource elements to be sent to the second and first network decoding nodes is used. By replacing L and R in equation 3 by min(L, R), equation 4 is obtained.

$$Y\frac{B}{\min(L,R)} = X\frac{A}{\min(L,R)} = Z \quad (4)$$

It must be recalled that Z is still an integer and applies to the determination of both the first number of resource elements, X for the first decoding node 302 and the second number of resource elements, Y for the second decoding node 306.

When applying multi-domain network coding however, the number of bits per resource element in the downlink from the network encoding node 304 to the first decoding node 302, may be different from the number of bits per resource element in the downlink from the network encoding node 304 to the second decoding node 306. For this reason, equation 3 is thus applicable.

As shown above the first number of resource elements, X is determined based a few parameters comprising the estimated first number of bits, A from the first decoding node 302. Also, the second number of resource elements, Y is determined based on parameters comprising the estimated number of bits to be received per resource element from the second decoding node 306.

Since data that is received from the first node 302 is destined for the second node 306, via the network coding node 304, the first number of resource elements X to be used by the first node 302 may be determined based on estimates of the number of bits to be sent per resource element, L to the second node 306. Similarly, since data that is received from the second node 306 is destined for the first node 302, via the network coding node 304, the second number of resource elements, Y to be used by the second node 306 may be determined based on estimates of the number of bits to be sent per resource element, R to the first node 302.

In the bit-level network coding the first number of resource elements X and the second number of resource elements Y, are determined based on estimates on the minimum of the number of bits to be sent per resource element to the second and first node, i.e. the min(L, R).

The network encoding node thus determines the number of resource elements for the first 302 and the second 306 decoding nodes, which said network encoding node performs in step 410 of the flowchart as presented in FIG. 4.

The following step is allocating the determined first and second number of resource elements to the first and second decoding node, respectively, in step 412, for sending data from said first 302 and second 306 decoding nodes to the network encoding node 304.

By allocating the determined number of resource elements to the decoding nodes, a good utilization is achieved whereby underutilization as well as delays are avoided, as mentioned above.

The network coding node 304 encodes data from the first node with data from the second node, and obtains coded data comprising a representation of first data and second data. This coded data is then sent to both the first and the second nodes, after which the first and second data are obtained by decoding by the second and first nodes, respectively.

The first data may be comprised in a first stream of bits and the second data may be comprised in a second stream of bits. The provision of said first and second streams by the network coding node to the second and first nodes, may thus comprise sending the same representation of first and second stream of bits to said first and second nodes.

For clarity, it is reconfirmed that the same representation of the first and second stream of bits can comprise the first stream of bits network coded with the second stream of bits. For encoding the first stream with the second stream of bits, an encoding operation such as the exclusive OR-operation, i.e. the XOR operation may be used.

It is mentioned that the first and second streams as received by the network coding node are not sent as such, i.e. as streams of bits to said first and second nodes. Rather they are coded with each other, for which reason a representation of said first and second streams is sent. In this respect, the first and second streams may therefore be considered to be provided to the second and first nodes, respectively, rather than being sent.

It is also mentioned that the first and second stream of bits are typically modulated using a modulation scheme, such as QPSK, 16 QAM or 64 QAM. The modulation order defines the number of bits per resource element. Using QPSK, 16 QAM and 64 QAM a number of 2, 4 and 6 bits, respectively, are used per resource element, or per symbol.

The step of estimating the first number of bits per resource element may therefore comprise estimating the modulation order for a link from the first node 302 to the network coding node 304. In the same way, in the step of estimating the second number of bits per resource element may hence comprise estimating the modulation order for a link from the second node 306 to the network coding node 304.

It is now explained in somewhat more detail the function of the units of the network coding node 200 of FIG. 2. The communication interface 202, which may be a communication unit such as a transmitter, is configured to receive a first stream of bits from the first node 302, 502, 602, and to receive a second stream of bits from the second node 306, 506, 606. It is also configured to provide said first stream of bits to said second node 306, 506, 606, and to provide said second stream of bits to said first node 302, 502, 602.

Figure 5:
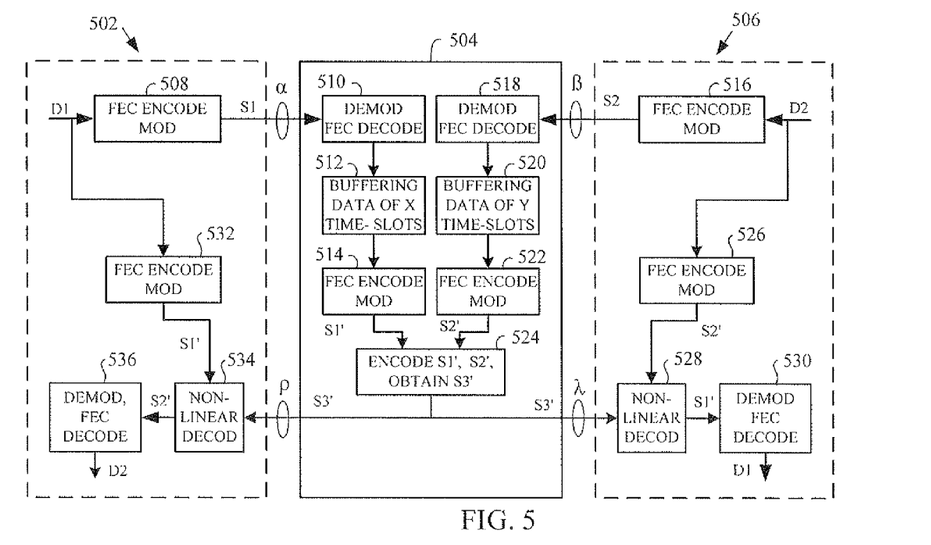
Figure 6:
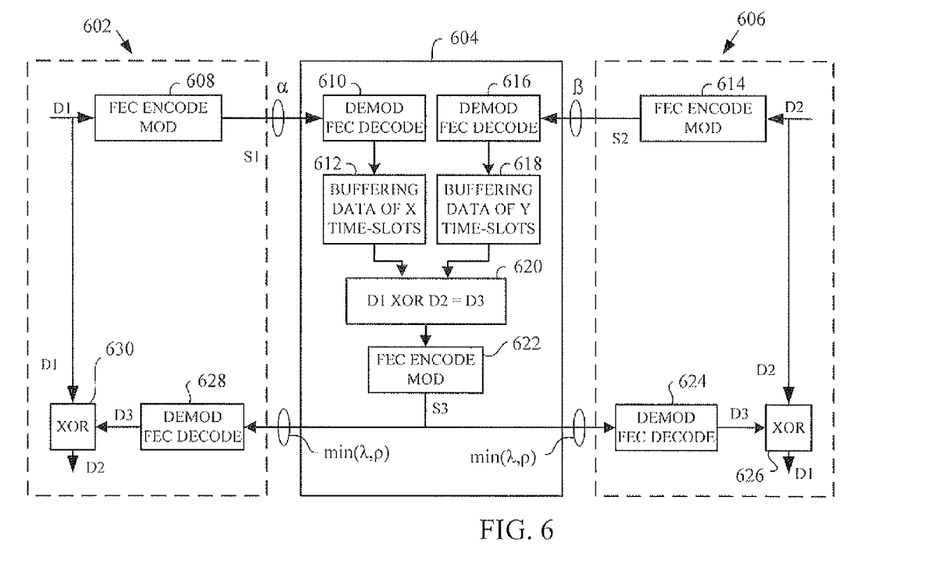
FIG. 6 schematically illustrates a network system for bit-level network coding, related to embodiments of the present invention.

The processing unit, which may be a processor, is configured to estimate a first number of bits to be received per resource element from said first node 302, 502, 602 in step 402, and a second number of bits to be received per resource element from said second node 306, 506, 606 in step 404. It is also configured to determine a first and second number of resource elements in step 410 for the first 302, 502, 602 and second 306, 506, 606 node, respectively.

The scheduling unit 206 is configured to allocate a first number of resource elements in step 412 for providing said first stream of bits to the network coding node 200, 304, 504, 604, and a second number of resource elements in step 412 for providing said second stream of bits to the network coding node 200, 304, 504, 604.

The processing unit 204 is further configured to determine the first and second number of resource elements in step 410 by fitting bits of the first number of resource elements where each resource element has the first number of bits for the first node 302, 502, 602, and bits of the second number of resource elements where each resource element has the second number of bits for the second node 306, 506, 606, in an equal number of resource elements to be allocated to the second 306, 506, 606 and first 302, 502, 602 node, for providing said first and second stream of bits, respectively, by using network coding. A coded representation of the first and second stream is thus sent to the first 302, 502, 602 and the second 306, 506, 606 node.

The processing unit 204 is further configured to determine the first number of resource elements in step 410 based on the estimated first number of bits to be received per resource element from the first node 302, 502, 602, and to determine the second number of resource elements in step 410 based on the estimated second number of bits to be received per resource element from the second node 306, 506, 606.

Moreover, the processing unit 204 is further configured to estimate a third number of bits in step 406 to be sent per resource element to the second node 306, 506, 606 and a fourth number of its in step 408 to be sent per resource element to the first node 302, 502, 602. The processing unit 204 is moreover configured to determine the first and second number of resource elements in step 410 based the estimated third and fourth number of bits to be sent per resource element to the second 306, 506, 606 and first 302, 502, 602 node, respectively.

The estimation of the first and second number of bits per resource element is performed by the processing unit that is therefore configured to estimate the modulation order for a link from the first node 302, 502, 602 to the network coding node 200, 304, 504, 604, and a link from the second node 306, 506, 606 to the network coding node 200, 304, 504, 604, respectively.

The network coding node 200, 304, 504, 604 may be any one of a User Equipment, UE, a base station and a relay node, where the base station may be a NodeB or an evolved NodeB, eNodeB.

Down below, realizations of embodiments of the present invention are presented.

Within some realizations, the communication interface 202 is configured to receive modulated data from a first and a second node, on a first and second UL channel, respectively. The processing unit 204 may be configured to demodulate the received data, whereas the scheduling unit 206 may be configured to buffer amounts of data from first and second nodes. As will be explained and described in detail further down, said amounts of data will be determined to be able to transmit a network coded representation of received data by utilizing the capacity of the network DL channels efficiently. In multi-domain network coding the buffered data is then modulated based on the capacity of the DL channels. Thereafter, the modulated data is network encoded by an encoding unit 208. In bit-level network coding, however, the buffered data is network encoded by the encoding unit 208 after which the encoded data is modulated by the processing unit 204, for which reason both representation of first and second data will be modulated according to the same Channel Quality Measure, CQM.

It is mentioned that the first and second nodes may be a first and a second end-node, which linked via a network coding node.

FIG. 5 schematically presents a coded bidirectional exchanging network system for multi-domain network coding. When using multi-domain network coding symbols that are network coded together may have different modulations. The symbols that are network coded together may hence be modulated differently and modulation is therefore chosen to utilize the capacity of the channels for transmission of data.

The system as schematically presented in FIG. 5 comprises a first network decoding node 502, a network encoding node 504 and a second network decoding node 506. The first and second network decoding nodes are here denoted U1 and U2, respectively. Also, the network coding node is denoted R. Further, the Up-Link channel between the first network decoding node, U1 and the network coding node, R is denoted U1 UL, and the Up-Link channel between the second network decoding node U2 and network coding node R, U2 UL. Also, the Down-Link channel between the network coding node R and the first network decoding node U1, is denoted U1 DL, and the Down-Link channel between the network coding node R and the second network decoding node U2, is denoted U2 DL.

Each channel is characterized by a Channel Quality Measure, CQM, for instance a Modulation and Coding Scheme, MCS, which dictates the coding and modulation that the channel supports. In FIG. 5 it is indicated the MCS of the two UL channels and the two DL channels. The MCS of the UL from U1 and U2 is denoted MCS $\alpha$ and MCS $\beta$, respectively. The MCS of the DL to U1 and U2 are denoted MCS $\rho$ and MCS $\lambda$, respectively.

It should be mentioned that the present invention is applicable to time division based systems, frequency division based systems, as well as combinations of the time and frequency division based systems.

In a time division based system the resource allocations are time slots over a given frequency bandwidth. In a frequency partitioned system resource allocations are hence frequency resources of a given time duration. In an Orthogonal Frequency Division Multiple Access (OFDMA) system resource allocation would be a combination of time slots and frequency resources, where assignments would accordingly occur in both time and frequency dimensions. It should be mentioned that the resource element comprises a resource in both the time and frequency dimension.

In the following it is assumed a system that is time division based, and wherein the resource allocations consequently are time slots over a given frequency bandwidth.

The task is here to find the number of time slots for which data U1 and U2 is to be collected in order to ensure that there the links will be fully utilized when the network coding node performs a network coding operation followed by transmission of the network coded information to the network decoding nodes.

The task is thus to ensure that after transmission by first and second end-users U1 and U2, all bits are network coded together, and thus no bits that are not network coded together. Having bits that are not network coded together would cause link underutilization and added complexity in managing bits that would be left behind or alternatively that there would be a need for zero padding.

In the following it will firstly be described how the amount of resource allocation is determined to secure capacity utilization of the UL and DL channels. Secondly, it will be described method steps within the network encoding node for achieving the channel utilization.

Applying the resource allocation to a time division based system, it is to be determined the number of time slots during which data is to be collected.

Denote by x, the number of time slots for which the network coding node will collect data from the first network decoding node U1 on the U1 UL channel, and denote by y, the number of time slots for network coding node will collect data from the second network decoding node U2 on the U2 UL channel.

It should be kept in mind that the first network decoding node U1 and the second network decoding node U2 will also channel encode and modulate the data according to the Modulation and Coding Schemes (MCSs) that are supported by the U1 UL and U2 UL channels. One example of channel coding is the Forward Error Correction (FEC) coding. The first network decoding node U1 will thus FEC encode and modulate data based on the MCS $\alpha$, and the second network decoding node U2 will FEC encode and modulate data based on the MCS $\beta$. As indicated in FIG. 5, the first network decoding node U1 FEC encodes and modulates data D1 into modulated data S1 in step 508 before transmitting said modulated data S1 to the network coding node R. The second decoding node U2 similarly FEC encodes and modulates data D2 in step 516 into modulated data S2 before transmitting said modulated data S2 to the network coding node R. Upon receipt of the modulated data S1 and S2, they are demodulated and FEC decoded according to the MCS $\alpha$ in step 510 and MCS $\beta$ in step 518, respectively.

As the number of time slots for which data is to be collected is determined, the network coding node R collects $x*\alpha$ bits from data as received from the first network decoding node U1 and $y*\beta$ bits from data as received from the second network decoding node U2.

It is mentioned that data from one network decoding node is destined to the other network decoding. The number of bits from U1 shall thus be transmitted to U2, and the number of U2 shall be transmitted to U1.

Since multi-domain network coding is used, the network coding node R may use separate CQMs in the form of MCSs for data destined to the first network decoding node U1 and to second network decoding node U2.

Consequently, the data destined to U2, i.e. the x*α bits are modulated by using MCS λ, whereas the data destined to U1, i.e. the y*β bits are modulated by using a MCS ρ.

Now, in order to avoid any link underutilization, the bits as destined to U2 and the bits as destined to U1 have to be transmitted by the same number of transmissions, as they are modulated into symbols and transmitted simultaneously, as will be described in more detail down below.

Denote by z the number of transmissions for which data has to be fully transmitted, the following equations need to be fulfilled:

$$x*\alpha = z*\lambda, \quad (5)$$

$$y*\beta = z*\rho \quad (6)$$

where z is one and the same integer.

From equations 5 and 6, equation 7, is easily obtained, wherein $$y\frac{\beta}{\rho} = x\frac{\alpha}{\lambda} \quad (7)$$

It should be noted that equations 5, 6 and 7 are depict the same relation as equations 1, 2 and 3, as presented earlier.

Hence, a number of transmissions or time slot resources x to be used by U1 associated with MCS α, and a number of transmissions or time slot resources y to used by U2 associated with MCS β, are determined using equation 7. The number of transmissions or time slot resources needed by network coding node R to transmit the data destined to U1 associated with an MCS ρ must be equal to the number of transmissions needed by R to transmit the data destined to U2 associated with an MCS λ. The reason is that data destined to U1 and U2 are sent simultaneously and network coded together.

It should be mentioned that the Channel Quality Measure in equations 5, 6 and 7, refer to averaged values. In the case of a Time Division Multiple Access, TDMA system, the MCS would thus be a time average during each number of time slots. This is due to that the properties of each link could change during each resource allocation for which reason the link would be characterized by more than one CQM during each resource allocation. Of course, an alternative to using an average value, explicit accounting for several CQM during each resource allocation could be performed.

Consequently, having information about the MCS of the different channels, the number of transmissions x and y are determined from the above equation.

Returning to FIG. 5 schematically illustrating network coding in a bidirectional exchanging system, it is indicated that the network coding node collects data from the first network decoding node for x time slots in step 512, and data from the second network decoding node for y time slots in step 520. Having collected said data the network coding node R then performs FEC encoding and modulation based on the MCS for each respective channel. The data bits x*α are FEC encoded and modulated based on MCS λ, in step 514 and the data bits y*β are FEC encoded and modulated based on MCS ρ in step 524, obtaining data S1' and data S2', respectively.

The created symbols S1' and S2' are then encoded with each other in step 524, creating network coded data S3', after which the symbols are transmitted to the first and second network decoding nodes U1 and U2 using z transmissions.

The number of transmissions that is required to send the network coded data by the network encoding node R to the first and second network decoding nodes, U1 and U2, respectively, may be obtained from either one of equations 1 and 2. Data S3' is thus transmitted on the U1 DL channel to the first network decoding node U1 and on the U2 DL channel to the second network decoding node U2.

One example of a coding operation that may be used here is multiplication of modulated and hence complex data, having real and imaginary parts. By transmitting the same complex signals to the first and to the second network decoding nodes, a representation of all data that where collected in steps 512 and 520 is transmitted.

For completeness it is further explained how the first and second decoding network nodes obtain the data that is destined to the respective nodes from the obtained network encoded data S3'.

The first network decoding node that has data D1 in bits first FEC encodes and modulates an amount of data corresponding to x transmissions into modulated S1' symbols in step 532.

The network encoded data S3' is now decoded in the first network decoding node U1. For this reason U1 uses the modulated data S1' and performs decoding of symbols S3' by using symbols S1'.

The coding operation that was used in step 524 has a corresponding reverse operation, with which either one of the two originally used signals is retrieved from the coded signal. By operating the coded data S3' by using S1', S2' is thus retrieved, and by operating the coded data S3' by using S2', S1' is obtained.

In the case of multiplication being the network coding operation, the reverse is division, although operating on complex symbols.

In step 534, the network coded signal s3' is thus decoded by using data S1', by which data S2' is obtained. Data S2' is then demodulated and FEC decoded according to the MCS that was used by the network coding node in step 522. In this case the first network decoding node performs FEC decoding and demodulation according to MCS ρ, and thus obtains the data D2 in bits.

Similarly, data D2 is FEC encoded and modulated based on MCS ρ in step 526 by the second network decoding node gaining data S2', after which the network coded data S3' is decoded by using said data S2' in step 528. Decoding of data S3' by using data S2' reveals data S1', which data is demodulated and FEC decoded in step 330 according to MCS λ, giving data D1 in bits.

Data transmitted from either the first or the second network decoding node is thus retrieved in the second or the first network decoding node by decoding the encoded data S3'.

Figure 7:
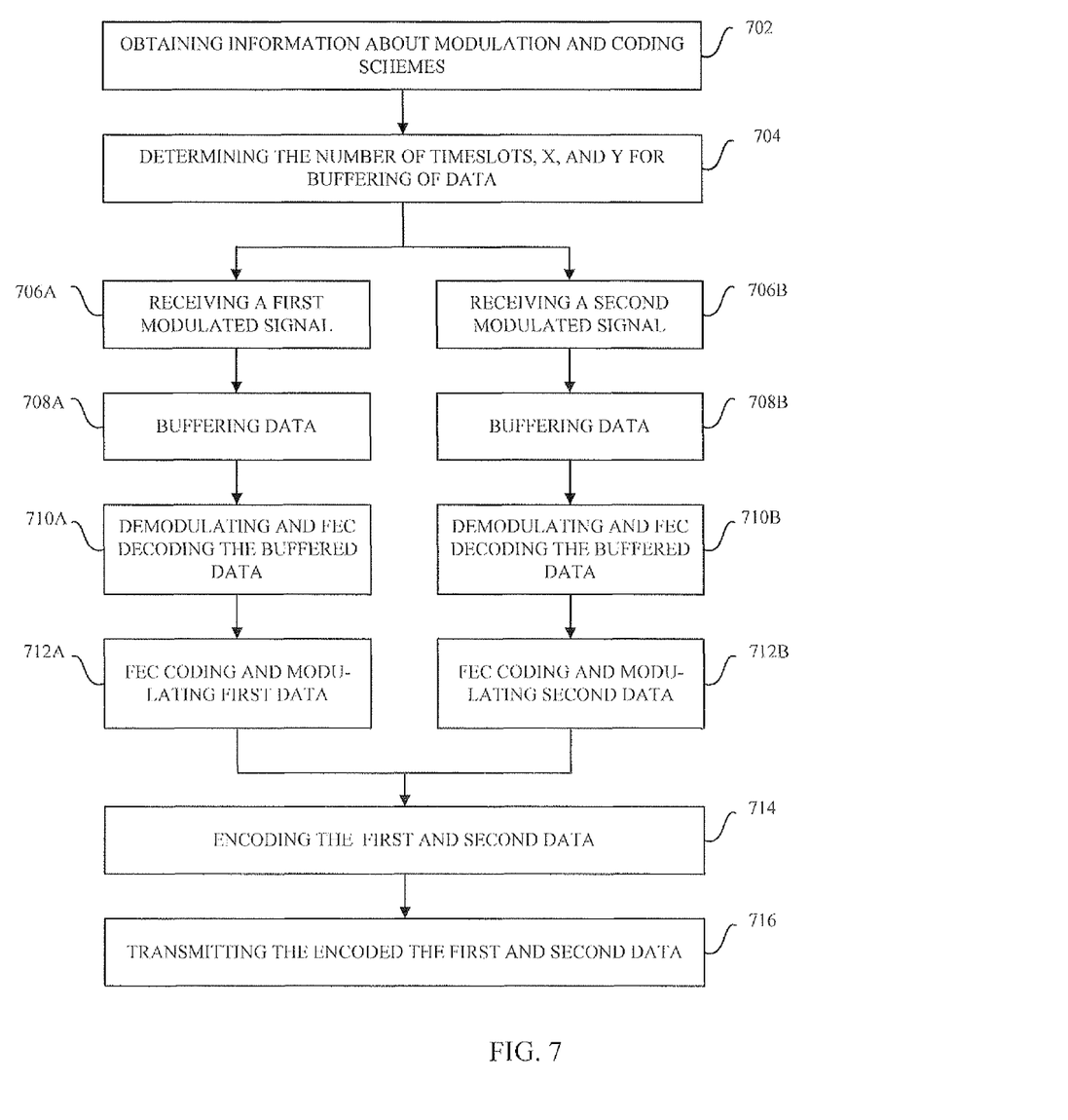
FIGS. 7 and 8 illustrate flow-charts of methods, related to embodiments of the present invention.

Before presenting a method for network coding in a communication system, as illustrated by a flow chart of FIG. 7, an illustrate example is presented that will shed further light on bidirectional network coding in exchanging systems.

For simplicity it is assumed that Forward Error Correction (FEC) coding is performed with a coding rate of 1. Further, the UL and DL channels between a first U1 and second U2 network decoding node and a network coding node, have to be established. Pone that U1 UL supports Quadrature Phase Shift Keying (QPSK) modulation, that U2 UL supports 16 Quadrature Amplitude Modulation (QAM), that U1 DL supports QPSK modulation, and finally that U2 DL supports 64QAM modulation. A QPSK modulation means that each symbol carries 2 bits, and a 16QAM modulation means that each symbol having a 16QAM modulation comprises 4 bits. A 64QAM modulation means that 6 bits are carried in each 64QAM modulated symbol. Denote by $\alpha$, the number of bits that are carried on the U1 UL, by $\beta$, the bits that can be carried on U2 UL, by $\rho$, the bits that are carried on U1 DL, and by $\lambda$, the bits that are carried on U2 DL. Thus $\alpha=2$, $\beta=4$, $\rho=2$ and $\lambda=6$.

Using equation (5) with said number of bits per symbol for the channels, reveals that $6y=x$. Since the number of transmissions has to be an integer, the first real solution is $y=1$, $x=6$. Since the network coding node receives $x*\alpha$ bits from U1 and $y*\beta$ from U2, the network coding node receives $6*2$ bits from U1, and $1*4$ bits from U2. From equations 1 and 2, it is determined the number of transmissions z of network coded data.

From equation 5, it is seen that $z=x*\alpha/\lambda=6*2/6=2$.
From equation 6, it is seen that $z=y*\beta/\rho=1*4/2=2$.

Since y and x were calculated from equation 7, which is based on equations 5 and 6, the number of z transmissions using equation 5 and 6, are the same.

The network coding node thus encodes 2 out of 4 bits from U2 and destined to U1, together with 6 bits out of 12 bits from U1 and destined to U2, and performs this twice after which the coded data is transmitted to U1 and U2. The first network coding node U1 will thus receive $2*2=4$ bits and the second network decoding node U2 will receive $2*6=12$ bits.

This data is thus transmitted without link underutilization, since the capacity of each channel or link has been taken into account in the above equations.

Now, referring to FIG. 7 presenting a flow chart of method steps of a method for network coding in a wireless communication system, said method will now be described in more detail.

The method starts with step 702 of obtaining information about modulation and coding schemes. This steps comprises obtaining information about a modulation and coding schemes (MCS) that supports UL communication between first and second network decoding nodes and a network coding node, being MCS $\alpha$ and MCS $\beta$, respectively, and information about the MCS that supports DL communication between the network coding node and first and second decoding nodes, being MCS $\lambda$ and MCS $\rho$.

Having obtained this information, the network coding node then determines the number of time slots x and y in step 704 for which data of first and second signals, respectively, is to be buffered, based on MCS $\alpha$ and MCS $\beta$ for the uplink, and on MCS $\lambda$ and MCS $\rho$, for the downlink, such that buffered first data coded and modulated based on MSC $\lambda$ and buffered second data coded and modulated based on MSC $\rho$ are transmitted to the second and first radio nodes respectively, in an equal number of transmissions.

It should be mentioned that the flow chart of FIG. 7 is applied to a time division base system wherein resource allocation is performed by allocating time slots. The scope of the present invention comprises allocation of resources in time, frequency or a combination of time and frequency dimensions as mentioned in prior sections above.

The network coding node may in this way obtain information about or at least estimate the capacity of each link. This information will be used when receiving data from the network decoding nodes. Now, the network coding node will receive a first signal from the first network decoding node in step 706A and receive a second signal from the second network decoding node in step 706B, wherein the first signal is coded and modulated based on MCS $\alpha$, and the second signal being coded based on MCS $\beta$.

In step 708A the network coding node buffers data from the first network decoding nodes during x time slots, for which the x number was determined in step 704. Likewise, the network coding node buffers data from the second network decoding nodes during y time slots in step 708B, for which the y number was determined in step 704. The buffered data from x time slots from the first signal is demodulated and FEC decoded according to MCS $\alpha$ in step 710A, whereas the buffered data from y time slots from the second signal is demodulated and FEC decoded according to MCS $\beta$ in step 710B.

In steps 710A and B, the complex symbols are thus demodulated into bits, for which reason the data is now FEC encoded and modulated based on different MCS. In step 712A, the network coding node FEC encodes and modulates data from x time slots of the first signal based on the MCS $\lambda$. Similarly, in step 712B data from y time slots of the second signal is modulated based on the MCS $\rho$ by the network coding node.

Having formed complex symbols of data from first and second network decoding nodes, the data is subjected to an encoding operation in step 714, obtaining a network encoded signal S3'. The formed complex network coded signal is then transmitted to the first and second network decoding nodes in step 716 for an equal number of transmissions. By transmitting data from first and second signals simultaneously by taking into account the capacity of each link, a full utilization of the capacity is achieved.

It shall be noted that the steps as presented in the flow chart of FIG. 7 may be ordered differently, for instance steps 710A and B of demodulating and FEC decoding may be performed prior to the step of buffering data, steps 708A and B. Such an embodiment of the invention was presented in connection with presenting the network coding system of FIG. 5.

Figure 8:
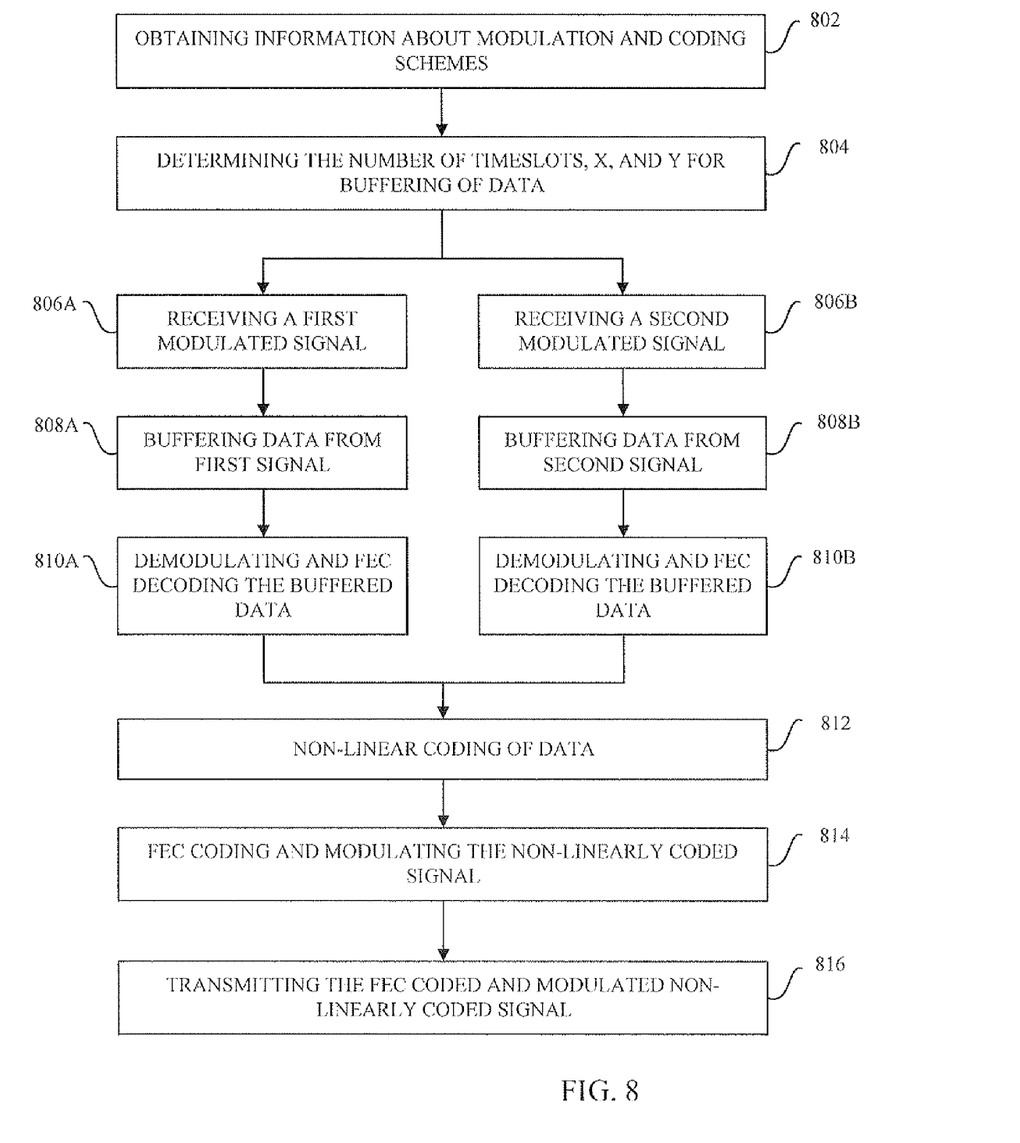

Having described multi-domain network coding above, down below will be presented bit-level network coding while referring to FIG. 6 illustrating a network coding system for bit-level coding and FIG. 8 illustrating a flow chart of method steps for bit-level network coding.

Within bit-level network coding symbols will be network coded together in a way similar to the multi-domain network coding. There are however differences. In bit-level network coding the symbols that will be network coded together must have exactly the same modulation. This implies that the number of bits related to a first signal must be the same as the number of bits related to a second signal.

In the following, the same network system will be used as was previously used in connection with bidirectional multi-domain network coding, with a few exceptions only. Reference to FIG. 6 will therefore be made. The bidirectional network system comprises a first network decoding node U1, 602, a network coding node R, 604 and a second network decoding node U2, 606. The first network decoding node U1 is linked to the network coding node R via a U1 uplink. The second network decoding node U2 606 is similarly linked to the network coding node R 604 via a U2 uplink. Also, there is a downlink between the network coding node R 604 and the first network decoding node U1 602, which is denoted U1 DL. Similarly, a downlink between the network coding node R 604 and the second network decoding node U2 606, is denoted U2 DL.

As previously described, each channel is characterized by a Channel Quality Measure (CQM), for instance the Modulation and Coding Scheme (MCS), which dictates the coding and modulation that the channel supports. In FIG. 6 it is indicated the MCS of the two UL channels and the two DL channels. The MCS of the UL from U1 and U2 is denoted $\alpha$ and $\beta$, respectively. Although the MCS of the DL to U1 and U2 may support separate MCS $\rho$ and $\lambda$, network coding on the bit-level may not be performed using separate DL MCSs.

As mentioned above, the symbols to be network coded together must have exactly the same modulation. This has a consequence concerning the modulation on the respective down links. Since both downlinks must at least support the same MCS, the MCS of the two will be the one being the weakest link of U1 DL and U2 DL. Since the U1 DL supports MCS $\rho$ and the U2 DL supports MCS $\lambda$, the weakest is the minimum of the two, i.e. min(MCS $\lambda$, MCS $\rho$), or in short min($\lambda$, $\rho$).

Accordingly the system is described by a U1 UL having a MCS $\alpha$, a U2 UL having a MCS $\beta$, and a U1 DL and U2 DL both of which having a MCS that is equal to min($\lambda$, $\rho$).

As for the case of multi-domain network coding, as described above, it is assumed that the network coding system is a time division based system. Needless to say, the system may alternatively be a frequency division based system or a combination of the two.

Now, the task when applying bit-level network coding in a time division based system is to determine the amount of time slots for which data is to collected from the first and second network decoding node U1 and U2, respectively, in order to ensure that the links will be fully utilized by the network coding node upon transmitting a signal that is network encoded from both the first and seconds signals.

Rephrased, the task is to ensure that after the transmissions by both network decoding nodes or end-users U1 and U2, all bits are network coded together, and thus no bits are left behind that are not network coded together. Bits left behind would cause link underutilization and added complexity in managing the remaining bits. Alternatively, zero padding would be required.

Now, denote by x, the number of time slots for which data is collected from U1 having a modulation MCS $\alpha$, and denote by y, the number of time slots for which data is collected from U2 having a modulation MCS $\beta$. As the modulation used sets the number of bits per symbol, collection of data being modulated with a certain MCS for a time duration, provides a well defined number of data bits.

Returning to FIG. 6 illustrating the network coding system, processing steps associated with network coding will now be described.

The first network decoding node U1 having data D1, first FEC encodes and modulates said data D1, based on MCS $\alpha$ and forms modulated data S1. Likewise, the second network decoding node U2 having data D2, first FEC encodes and modulates said data D2, based on MCS $\beta$ and forms modulated data S2.

The modulated data S1 and S2 is then transmitted to the network coding node R, after which the data is demodulated and FEC decoded according to MCS $\alpha$, in step 610 and MCS $\beta$, in step 616, respectively.

Having defined x and y, as above, data bits from first network decoding node and second network decoding node are acquired. Acquiring or buffering of data from U1 is performed in step 612, whereas acquiring or buffering of data from U2 is performed in step 618.

Down below it will be described how to determine the number of transmissions or time slots x and y for collecting data from first network decoding node U1 and second network decoding node U2, respectively.

The network coding node R now has collected x*$\alpha$ bits from first network decoding node U1, destined to second network decoding node U2, and y*$\beta$ bits from second network decoding node U2, destined to first network decoding node U1.

Now, since bit-level network coding is applied, the network coding node R will have to use the same MCS for FEC coding and modulation for data destined to the first network decoding node U1, as for data destined to second network decoding node U2.

Denote by z the number of transmissions for which data has to fully transmitted, keeping in mind that one and the same MCS has to be used for transmission on the DL, the following equations have to be fulfilled:

$$x^*\alpha = z^*\min(\lambda,\rho) \quad (4)$$

$$y^*\beta = z^*\min(\lambda,\rho), \quad (5)$$

where z is one and the same integer.

From equations 4 and 5, equation 6 is easily formed, $$y\frac{\beta}{\min(\lambda,\rho)} = x\frac{\alpha}{\min(\lambda,\rho)} = z \quad (6)$$

Given a number of transmissions or time slots x for which data, modulated based on MCS $\alpha$, is collected from U1 and a number of transmissions or time slots y for which data, modulated based on MCS $\beta$, is collected from U2, the number of transmissions needed by the network encoding node R to transmit the data destined to U1 associated with MCS min($\lambda$, $\rho$) is the same as the number of transmissions needed by the network encoding node R to transmit the data destined to U2 associated with the same MCS min($\lambda$, $\rho$).

It should be noted that since z denotes the number of transmissions for simultaneously transmitting data destined to U1 and U2, z obviously has to be an integer. Having knowledge about the MCS of the different channels, the number of transmissions or time slots x and y is determined from the above equation.

It has thus been explained how to determine the amount of data to collect in steps 612 and 618. Having collected the data D1 and D2, said data is subjected to an XOR operation being one example of an encoding operation, in step 620. An encoded signal D3 is obtained, which is FEC encoded and modulated in step 622 based on the min(MCS $\lambda$, MCS $\rho$).

The modulated encoded signal S3 is now transmitted to the first and second network decoding nodes U1 and U2, respectively, using z transmissions.

As was explained above the symbols to be network coded together must have the same modulation. According to an alternative to the implementation of bit-level network encoding as presented above, channel coding such as Forward Error Correction, FEC, coding may be performed prior to step 620, i.e. prior to performing network coding. Channel coding may thus be performed on first data D1 and second data D2 separately, after step 612 and 618, respectively, by using different coding rates. Although the network coded data must have the same modulation, as the data is coded together, the coding rate in the channel coding may differ. Subsequent to channel coding, the number of channel encoded bits from U1 and the number of channel encoded bits have to be the same. Also, the network coded data D3 from the network coding step, step 620 from first data D1 being channel encoded and second data D2 being channel encoded, has to be a valid channel encoded codeword. This limits the number of channel codes that is used.

For completeness, a brief description will be presented for the processing by the network decoding nodes U1 and U2, for retrieving the original data D2 and D1, respectively, from the encoded data S3.

The first network decoding node U1 receives the network encoded data S3 and demodulates and FEC decodes the data according to the min(MCS λ, MCS ρ), in step 628. This demodulation and decoding will reveal demodulated data D3. Having data D3 in the form of bits, a decoding operation is performed by the network decoding node in step 630, by for instance applying an XOR operation based on data D1 a priori known by the first network decoding node U1. Performing an XOR operating on D3 based on data D1, reveals data D2, i.e. data that was originally transmitted from the second network decoding node U2 to the network coding node R, and which was destined to the first network decoding node U1.

Corresponding process steps are performed by the second network decoding node U2 for revealing data D1, when demodulating and FEC decoding data S3 in step 624, followed by decoding data D3 using data D2 a priori known by the second network decoding node U2, revealing data D1. Said D1 data was originally transmitted from the first network decoding node U1 to the network coding node R, and was destined to the second network decoding node U2.

Illustrative examples of bit-level network coding of the above system will now be presented. For simplicity, it is assumed that all FEC coding will have coding rate of 1 for both examples.

Within a first example, assume that U1 UL supports Quadrature Phase Shift Keying (QPSK) modulation, that U2 UL and U1 DL support 16 Quadrature Amplitude Modulation (QAM), and finally that U2 DL supports 64QAM modulation. As earlier explained a QPSK modulated symbol carries 2 bits, a 16QAM modulated symbol carries 4 bits, and a 64QAM modulated symbol carries 6 bits. Denote by $\alpha$, the number of bits that is carried on the U1 UL, by $\beta$, the bits that is carried on U2 UL, by $\rho$, the bits that is carried by U1 DL, and by $\lambda$, the bits that is carried on U2 DL. Accordingly, $\alpha=2$, $\beta=4$, $\rho=2$ and $\lambda=6$.

Using equation 6 above reveals that $y=x/2=z$. As the number of transmissions is an integer, the first solution is $y=1$, $x=2$, and $z=1$.

In other words, the network encoding node R has $x*\alpha=2*2=4$ bits from U1, and $y*\beta=1*4=4$ bits from U2 to transmit using $z=1$ transmission. The network encoding node R will thus have 4 bits destined to U2 and 4 bits destined to U1. Since min($\lambda$, $\rho$)=4, the network encoding node R encodes the 4 bits destined for U1 with the 4 bits destined to U2 and uses a single transmission since $z=1$ to transmit the encoded data. By transmitting once only by the network encoding node, the first network decoding node U1 will receive its 4 bits and the second network decoding node U2 will receive its 4 bits, without any link underutilization.

Within a second example, assume that U1 UL supports QPSK modulation having $\alpha=2$, that U2 UL supports 16QAM modulation having $\beta=4$, that U1 DL supports 64QAM modulation having $\rho=6$, and that U2 DL supports 64QAM modulation having $\lambda=6$. Using equation 6 with these modulation data, reveals: $x/3=2y/3=z$, where z is an integer. The smallest possible z for a solution is here 2, with $x=6$ and $y=3$.

The network encoding node will thus have $x*\alpha=6*2=12$ bits destined to U2 and $y*\beta=3*4=12$ bits destined to U1. Since min($\lambda$, $\rho$)=6, the network encoding node R uses $z=2$ transmissions to transmit 12 bits to U2 and 12 bits to U1.

By transmitting twice by the network encoding node, the first and second network decoding nodes U1 and U2, respectively, will receive their respective bits, without any link underutilization.

Referring to FIG. 8, illustrating a flow chart of method steps, a method for bit-level network coding will now be presented.

The method may start with step 802 of obtaining information about a modulation and coding scheme (MCS) that supports UL communication between first and second network decoding nodes and a network coding node, being MCS $\alpha$ and MCS $\beta$, respectively, and information about the MCS that supports DL communication between the network coding node and first and second decoding nodes, being MCS $\lambda$ and MCS $\rho$.

Having obtained this information, the network coding node then determines the number of time slots x and y in step 804 for which data of first and second signals, respectively, is to be buffered, based on MCS $\alpha$ and MCS $\beta$ for the uplink, and the minimum of MCS $\lambda$ and MCS $\rho$, for the downlink, such that buffered first and second data coded and modulated based on min (MCS $\lambda$, MCS $\rho$) is transmitted to the second and first network decoding nodes respectively, in an equal number of transmissions.

It should be mentioned that the flow chart of FIG. 8 also is applied to a time division base system wherein resource allocation is performed by allocating time slots. The scope of the present invention comprises allocation of resources in time, frequency or a combination of time and frequency dimensions as mentioned in prior sections above.

The network coding node may in this way obtain information about or at least estimate the capacity of each link. This information will be used when processing data from the network decoding nodes. Now, the network coding node will receive a first signal from the first network decoding node in step 806A and a second signal from the second network decoding node in step 806B, wherein the first signal is coded and modulated based on MCS $\alpha$, and the second signal being coded based on MCS $\beta$.

In step 808A the network coding node buffers data from the first network decoding node during x time slots, whereas in step 808B the network coding node buffers data from the second network decoding node during y time slots. It is mentioned that the x and y numbers were determined in step 804.

In step 810A the buffered data from x time slots from the first signal is demodulated and FEC decoded according to MCS $\alpha$, whereas in step 810B the buffered data from y time slots from the second signal is demodulated and FEC decoded according to MCS $\beta$.

In step 812, the network coding node performs an encoding operation of first data from x time slots and second data from y time slots, obtaining network encoded data D3. In step 814 the network coding node FEC encodes and modulates the network encoded data D3 based on minimum MCS of MCS $\lambda$ and MCS $\rho$, and thus forms modulated encoded data S3.

The formed complex network coded signal is then transmitted to the first and second network decoding nodes in step 816 for an equal number of transmissions. By transmitting data from first and second signals simultaneously by taking into account the capacity of each link, a full utilization of the capacity is achieved.

It shall be noted that the steps as presented in the flow chart of FIG. 8 may be ordered differently, for instance steps 810A and B of demodulating and FEC decoding may be performed prior to the step of buffering data, steps 808A and B. Such an embodiment of the invention was presented in connection with presenting the network coding system of FIG. 6.

Within some realizations on the present embodiment the network coding node and its comprised units, as schematically illustrated in FIG. 2, may be configured to perform tasks being described below. The communication interface 202 may thus be configured to perform step 702 and 802, of obtaining information about various MCSs. The processing unit 204 may be configured to perform steps 704 and 804, of determining allocation resources in a general embodiment for buffering of data from the network decoding nodes. The scheduling unit 206 may however be configured to acquire or collect the corresponding data. The encoding unit 208 may be configured to perform steps 714 and 812 of performing coding. The processing unit 204 may be configured to perform steps 710A,B, 712A,B, 810A,B, and 814, of the flow chart steps. Also, the network coding node may comprise a control unit 210, which may be configured to control the operation of units as comprised in the network coding node 200, 304, 504, 604.

The embodiments of the present invention provide at least the following main advantages:

By providing a generic method for resource allocation applicable to a coded bidirectional exchanging systems, resource allocation is obtained that avoids underutilization of resources and avoids delay to be introduced. A smooth network coding operation and thus a functional network coding system is thus assured.

The advantage of avoiding link underutilization is that the capacity of the utilized links may be maximized.

Delays that may have been introduced by the network coding operation are eliminated, which provides a higher data throughput.

As the proposed methods are easy to implement and use, complexities possibly introduced by a network coding operation are eliminated.

It must be emphasized that the present invention may be varied in many ways. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims.

The invention claimed is:

1. A method in a network coding node, said network coding node configured to receive a first stream of bits from a first node, receive a second stream of bits from a second node and provide said first and second stream of bits to said second and first nodes, respectively, using network coding, the method comprising:
the network coding node estimating a first number of bits per resource element to be received from said first node,
the network coding node estimating a second number of bits per resource element to be received from said second node,
the network coding node determining a first and a second number of resource elements for the first and second node, respectively,
the network coding node allocating the first number of resource elements to the first node for providing said first stream of bits from the first node to the network coding node, and
the network coding node allocating the second number of resource elements to the second node for providing said second stream of bits from the second node to the network coding node,
wherein said step of determining the first and second number of resource elements comprises fitting the bits received from each one of said first node and said second node in an equal integer number of resource elements being allocated for providing said first and second stream of bits from the network coding node to said second and first nodes, respectively, using network coding.

2. The method according to claim 1, wherein the first number of resource elements is determined based on the estimated first number of bits per resource element to be received from said first node.

3. The method according to claim 1, wherein the second number of resource elements is determined based on the estimated second number of bits per resource element to be received from said second node.

4. The method according to claim 1, wherein
the method further comprises: estimating a third number of bits per resource element to be sent to the second node; and estimating a fourth number of bits per resource element to be sent to the first node,
the step of determining the first number of resource elements comprises determining the first number of resource elements based on the estimated third number of bits per resource element, and
the step of determining the second number of resource elements comprises determining the second number of resource elements based on the estimated fourth number of bits per resource element.

5. The method according to claim 1, wherein providing said first and second stream of bits to said second and first node, respectively, comprises sending one and the same representation of said first and said second stream of bits to said first and second nodes.

6. The method according to claim 5, wherein the same representation of said first and said second stream of bits comprises said first stream of bits network coded with said second stream of bits.

7. The method according to claim 1, wherein estimating a first number of bits per resource element comprises estimating the modulation order for a link from the first node to the network coding node.

8. The method according to claim 1, wherein estimating a second number of bits per resource element comprises estimating the modulation order for a link from said second node to the network coding node.

9. The method according to claim 1, wherein the step of estimating the first number of bits per resource element is based on a number of bits per resource element previously received by the network coding node from the first node.

10. The method according to claim 1, wherein the step of estimating the second number of bits per resource element is based on a number of bits per resource element previously received by the network coding node from the second node.

11. A network coding node for multidirectional communication with at least a first and a second node, the network coding node comprising;
- a communication interface configured to receive a first stream of bits from the first node, a second stream of bits from the second node, and provide said first and second stream of bits to said second and first node, respectively,
- data processing circuitry configured to estimate a first number of bits per resource element to be received from said first node, and estimate a second number of bits per resource element to be received from said second node, and determine a first and a second number of resource elements for the first and second nodes, respectively, and
- a scheduling unit configured to allocate the first number of resource elements to the first node for providing said first stream of bits from the first node to the network coding node, and allocate the second number of resource elements to the second node for providing said second stream of bits from the second node to the network coding node,
- wherein the data processing circuitry is configured to determine the first and second number of resource elements by fitting the received bits of the first number of resource elements each having the first number of bits per resource element from the first node, and the received bits of the second number of resource elements each having the second number of bits per resource element from the second node in an equal number of resource elements to be allocated for providing said first and second stream of bits from the network coding node to the second and first nodes, respectively, using network coding.

12. The network coding node according to claim 11, wherein the processing unit further is configured to determine the first number of resource elements based on the estimated first number of bits per resource element to be received from the first node, and to determine the second number of resource elements based on the estimated second number of bits per resource element to be received from the second node.

13. The network coding node according to claim 11, wherein the processing unit further is configured to estimate a third and a fourth number of bits to be sent per resource element to the second and first node, respectively, and configured to determine the first and second number of resource elements based the estimated number of bits to be sent per resource element to the second and first node, respectively.

14. The network coding node according to claim 11, wherein the processing unit further is configured to estimate the first and second number of bits per resource element, by estimating the modulation order for a link from the first node to the network coding node, and a link from the second node to the network coding node, respectively.

15. The network coding node according to claim 11, wherein the network coding node comprises any one of a User Equipment (UE), a base station, and a relay node.

16. The network coding node according to claim 15, wherein the base station comprises a NodeB or an evolved NodeB (eNodeB).

17. The network coding node according to claim 11, wherein the data processing circuitry is configured to estimate the first number of bits per resource element based on a number of bits per resource element previously received by the network coding node from the first node.

18. The network coding node according to claim 11, wherein the data processing circuitry is configured to estimate the second number of bits per resource element based on a number of bits per resource element previously received by the network coding node from the second node.

19. A method in a network coding node, said network coding node configured to receive a first stream of bits from a first node, receive a second stream of bits from a second node and provide the first and second stream of bits to said second and first nodes, respectively, using network coding, the method comprising:
- the network coding node estimating a first number of bits per resource element to be received from the first node,
- the network coding node estimating a second number of bits per resource element to be received from the second node,
- the network coding node estimating a third number of bits per resource element to be sent to the second node,
- the network coding node estimating a fourth number of bits per resource element to be sent to the first node,
- the network coding node determining a first and a second number of resource elements for the first and second node, respectively,
- the network coding node allocating the first number of resource elements to the first node for providing the first stream of bits from the first node to the network coding node, and
- the network coding node allocating the second number of resource elements to the second node for providing the second stream of bits from the second node to the network coding node,
- the step of determining the first number of resource elements comprises determining the first number of resource elements based on the estimated third number of bits per resource element, and
- the step of determining the second number of resource elements comprises determining the second number of resource elements based on the estimated fourth number of bits per resource element.

* * * * *

UNITED STATES PATENT AND TRADEMARK OFFICE
CERTIFICATE OF CORRECTION

PATENT NO. : 9,231,812 B2
APPLICATION NO. : 13/820398
DATED : January 5, 2016
INVENTOR(S) : Manssour It is certified that error appears in the above-identified patent and that said Letters Patent is hereby corrected as shown below:

Specification

In Column 13, Line 61, delete "MCS $\lambda$," and insert -- MCS $\lambda$ --, therefor.

Claims

In Column 23, Line 3, in Claim 11, delete "comprising;" and insert -- comprising: --, therefor.

In Column 23, Line 34, in Claim 12, delete "further is" and insert -- is further --, therefor.

In Column 23, Line 41, in Claim 13, delete "further is" and insert -- is further --, therefor.

In Column 23, Line 48, in Claim 14, delete "further is" and insert -- is further --, therefor.

In Column 24, Line 17, in Claim 18, delete "form" and insert -- from --, therefor.

Signed and Sealed this
Nineteenth Day of April, 2016

Michelle K. Lee
*Director of the United States Patent and Trademark Office*